United States Patent
Choi et al.

(10) Patent No.: US 10,532,660 B2
(45) Date of Patent: Jan. 14, 2020

(54) CLUSTER FOR VEHICLE

(71) Applicant: HYUNDAI MOBIS CO., LTD., Seoul (KR)

(72) Inventors: Jong Wan Choi, Yongin-si (KR); Hyung Soo Kim, Seongnam-si (KR); Sang Hun Yoo, Seongnam-si (KR); Han Tae Kang, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/028,758

(22) Filed: Jul. 6, 2018

(65) Prior Publication Data

US 2019/0135110 A1    May 9, 2019

(30) Foreign Application Priority Data

Nov. 7, 2017   (KR) .................. 10-2017-0147163

(51) Int. Cl.
   *B60K 35/00* (2006.01)

(52) U.S. Cl.
   CPC .......... *B60K 35/00* (2013.01); *B60K 2370/16* (2019.05); *B60K 2370/60* (2019.05)

(58) Field of Classification Search
   CPC ..................... B60K 35/00; B60K 2350/40
   USPC ............... 340/461, 425.5, 438, 439, 459
   See application file for complete search history.

(56) References Cited

U.S. PATENT DOCUMENTS

| | | | | |
|---|---|---|---|---|
| 6,048,020 A | * | 4/2000 | Gronowicz | B60R 16/0238 174/72 A |
| 6,107,929 A | * | 8/2000 | Amari | H01R 13/641 307/10.2 |
| 2010/0090870 A1 | * | 4/2010 | Masuda | B60R 11/02 340/995.26 |
| 2012/0013548 A1 | * | 1/2012 | Choi | B60K 35/00 345/173 |
| 2015/0102762 A1 | * | 4/2015 | Goei | H02J 7/355 320/101 |
| 2015/0371408 A1 | * | 12/2015 | Schultz | G06T 11/001 345/589 |
| 2016/0110148 A1 | * | 4/2016 | Egle | B60K 37/06 345/173 |
| 2016/0240189 A1 | * | 8/2016 | Lee | G06F 3/167 |
| 2016/0327987 A1 | * | 11/2016 | Huitema | G06F 1/1652 |
| 2017/0085807 A1 | * | 3/2017 | Tsujioka | G06F 3/1423 |
| 2017/0179989 A1 | * | 6/2017 | An | H04B 1/3822 |
| 2018/0370365 A1 | * | 12/2018 | Lee | G06F 3/0482 |

FOREIGN PATENT DOCUMENTS

KR    10-1628912 B1    6/2016

* cited by examiner

*Primary Examiner* — Daryl C Pope
(74) *Attorney, Agent, or Firm* — Knobbe Martens Olson & Bear LLP

(57) ABSTRACT

A cluster for a vehicle may include a center module including a center display unit, and a side module mounted to a side surface of the center module, and including a side display unit and the side module may be removably coupled to the center module.

8 Claims, 5 Drawing Sheets

CLUSTER FOR VEHICLE

CROSS-REFERENCES TO RELATED APPLICATIONS

The present application claims priority to Korean application number 10-2017-0147163, filed on Nov. 7, 2017, which is incorporated by reference in its entirety.

BACKGROUND OF THE INVENTION

The present invention relates to a cluster for a vehicle, and more particularly, to a cluster for a vehicle which is configured to allow additional modules according to a model of the vehicle or options to be mounted to opposite sides of a center module.

In general, a driver's seat of a vehicle is provided with a cluster for indicating the speed, fuel conditions, temperature, etc. of the vehicle. The cluster is configured of a step motor and a pointer. The cluster includes warning lamps related to lights, a brake, an engine, etc. to indicate conditions of the vehicle. Such warning lamps may have different shapes depending on region or specifications of vehicles. Therefore, there is a disadvantage in that different kinds of clusters should be manufactured by separate methods depending on regions or vehicle models. Furthermore, recently, there is need to improve the configuration of such a cluster so that a liquid crystal display (LCD) and segments suitable for digital cluster environment can be applied to the cluster. Therefore, improvement in the configuration of the conventional cluster is required.

The related art of the present invention is disclosed in Korean Patent Registration Publication No. 10-1628912 (published on Jun. 2, 2016 and entitled "Instrument cluster for vehicle").

SUMMARY OF THE INVENTION

Embodiments of the present invention are directed to a cluster for a vehicle which is configured to allow additional modules according to a model of the vehicle or options to be mounted to opposite sides of a center module.

In one embodiment, a cluster for a vehicle may include: a center module including a center display unit; and a side module mounted to a side surface of the center module, and including a side display unit. The side module may be removably coupled to the center module.

Furthermore, a terminal insert groove may be formed in the center module, a terminal part corresponding to the terminal insert groove may be provided on the side module, and the terminal part may be inserted into the terminal insert groove so that the side module and the center module are coupled to each other.

The cluster may further include a sealing unit mounted on an outer surface of the terminal part and disposed between the terminal insert groove and the terminal part.

The sealing unit may include elastically deformable material.

The center display unit may include a speed indicator configured to indicate a speed of the vehicle. The side display unit may include a warning light indicator configured to indicate a status of the vehicle.

The center display unit may include: a weather information display provided to display weather outside the vehicle; and a phone mode display provided to display a connection status of a phone.

The center display unit may further include a multimedia information display provided to display a status of a multimedia device installed in the vehicle.

The side display unit may include: a fuel indicator provided to indicate an amount of fuel of the vehicle; and a temperature indicator provided to indicate a temperature in a passenger compartment of the vehicle.

The side display unit may further include an RPM (revolution per minute) indicator provided to indicate an RPM of an engine of the vehicle.

The center module and the side module may be mounted in a receiving groove of a mounting support fixed to a center fascia of the vehicle.

DESCRIPTION OF SPECIFIC EMBODIMENTS

Hereinafter, a cluster for vehicles in accordance with the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
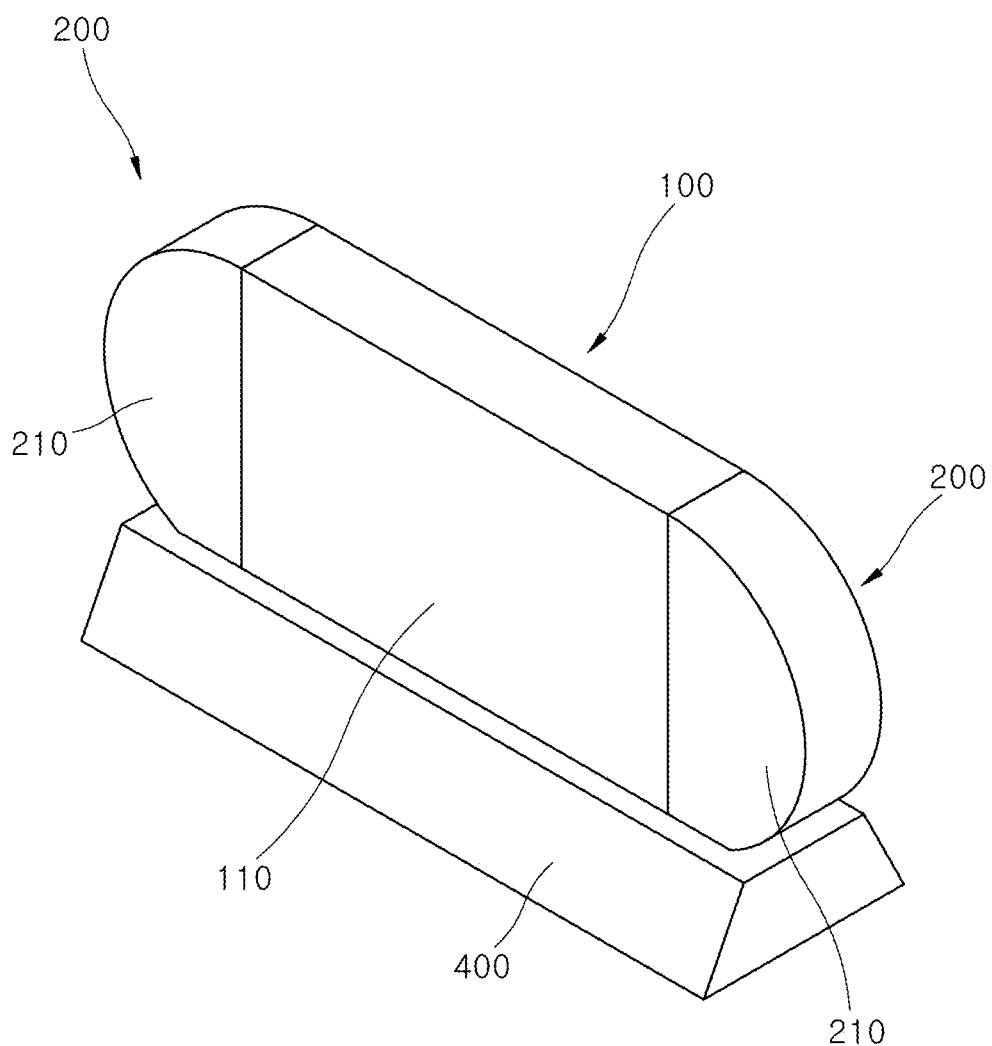
FIG. 1 is a perspective view schematically illustrating a cluster for vehicles in accordance with the present invention.
Figure 2:
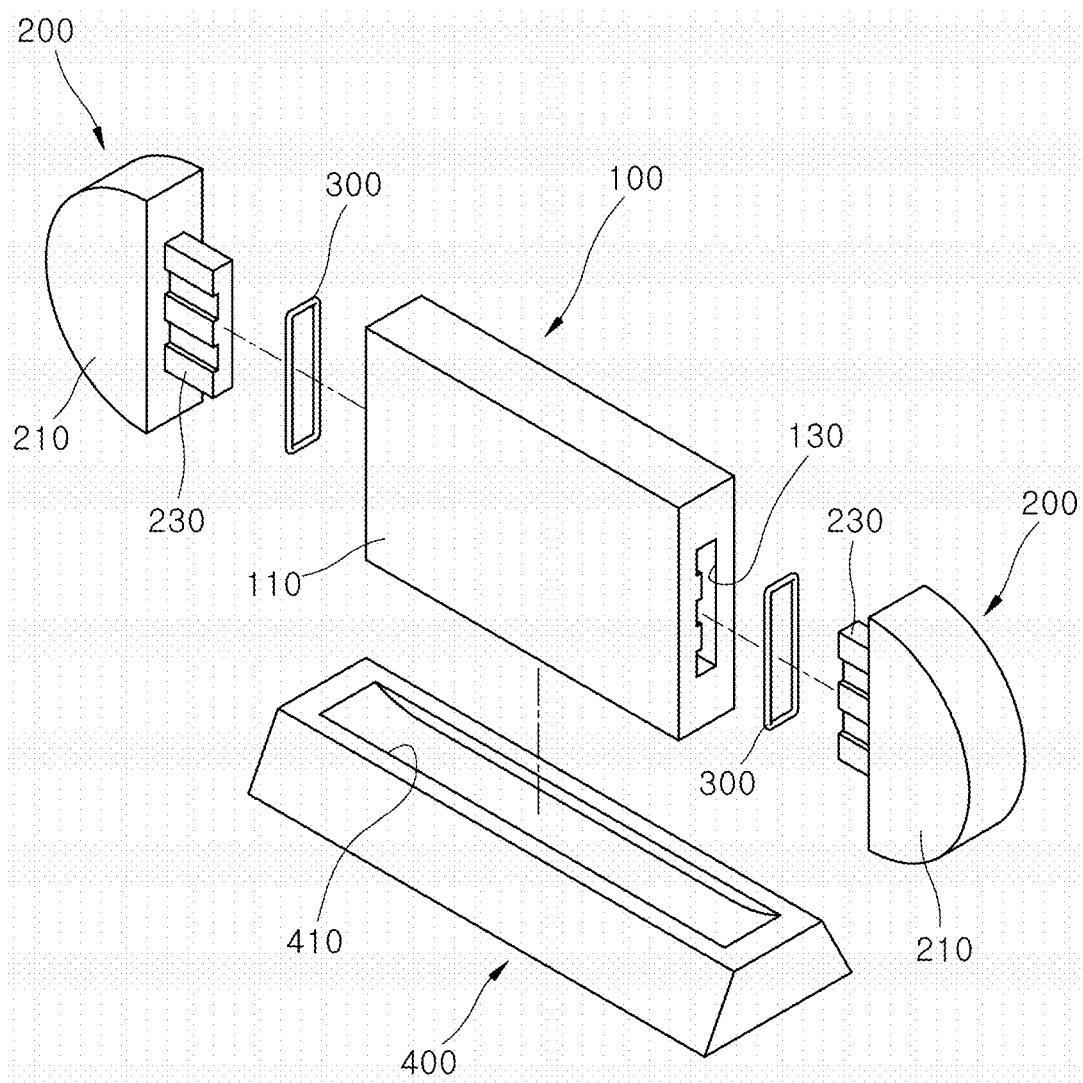
FIG. 2 is an exploded perspective view schematically illustrating the cluster for vehicles in accordance with the present invention.
Figure 3:
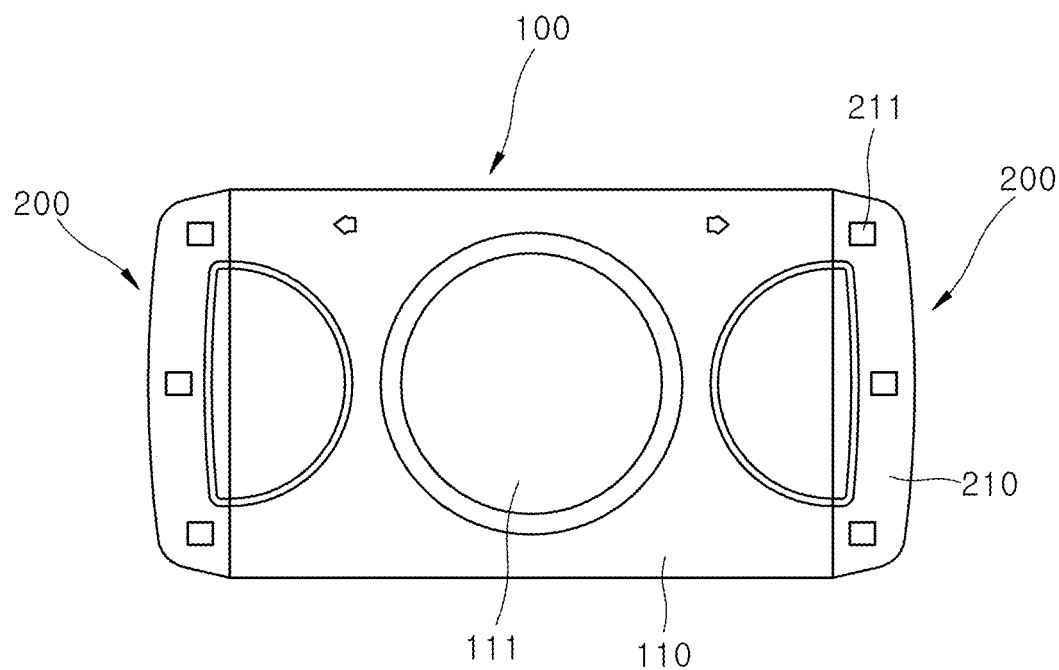
FIG. 3 is a conceptual view schematically illustrating a first embodiment of the cluster for vehicles in accordance with the present invention.
Figure 4:
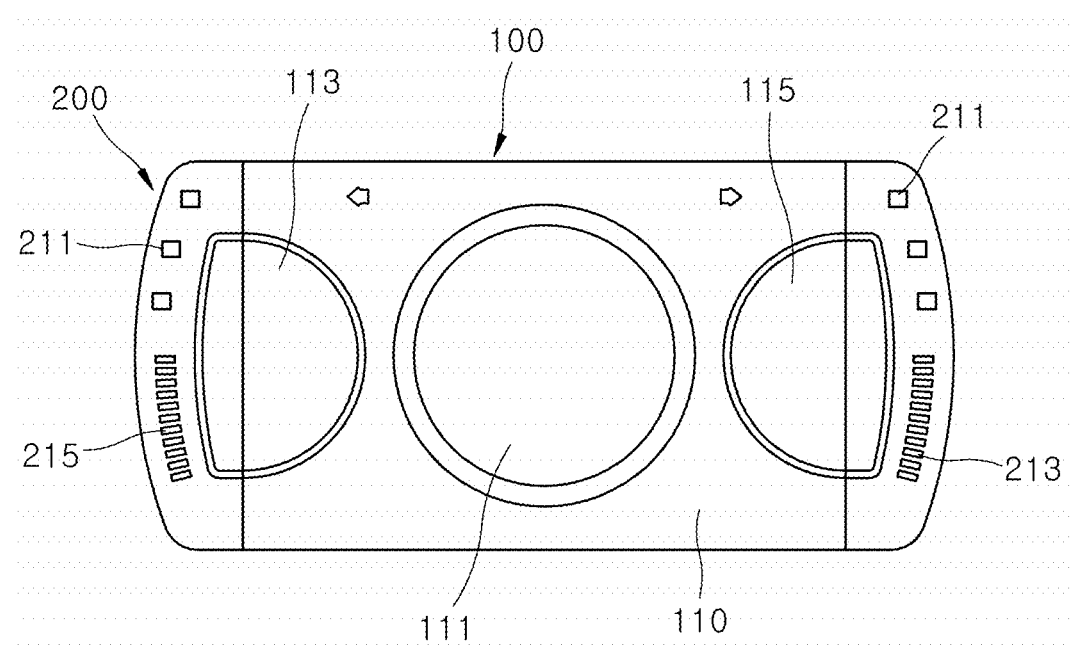
FIG. 4 is a conceptual view schematically illustrating a second embodiment of the cluster for vehicles in accordance with the present invention.
Figure 5:
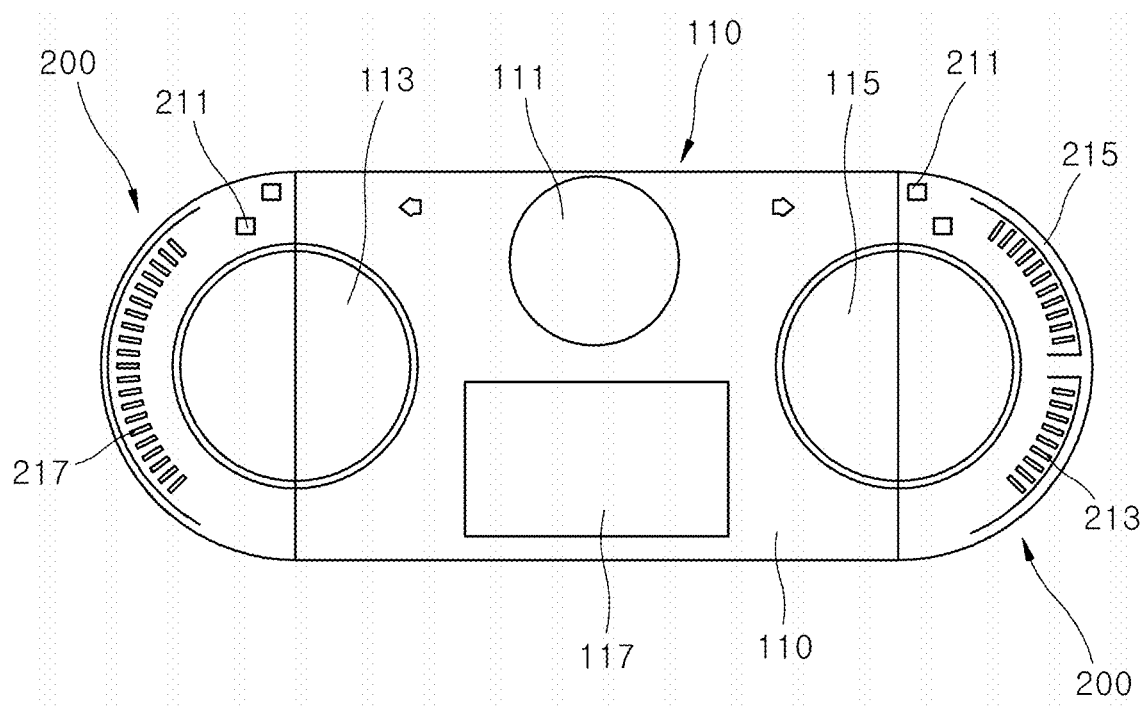
FIG. 5 is a conceptual view schematically illustrating a third embodiment of the cluster for vehicles in accordance with the present invention.

FIG. 1 is a perspective view schematically illustrating the cluster for vehicles in accordance with the present invention. FIG. 2 is an exploded perspective view schematically illustrating the cluster for vehicles in accordance with the present invention. FIG. 3 is a conceptual view schematically illustrating a first embodiment of the cluster for vehicles in accordance with the present invention. FIG. 4 is a conceptual view schematically illustrating a second embodiment of the cluster for vehicles in accordance with the present invention. FIG. 5 is a conceptual view schematically illustrating a third embodiment of the cluster for vehicles in accordance with the present invention.

Referring to FIGS. 1 and 2, the cluster for a vehicle in accordance with an embodiment of the present invention includes a center module 100 and side modules 200. The center module 100 includes a center display unit 110 oriented toward an occupant of the vehicle. Indicating lamps for indicating statuses of the vehicles, warning signs, statuses of multimedia devices, etc. are provided in the center display unit 110. Indicating lamps for displaying statuses of the vehicles, warning signs, statuses of multimedia devices, etc. which are not displayed on the center display unit 110 are provided in side display units 210. Each of the center display unit 110 and the side display units 210 is formed of a liquid crystal display (LCD).

A terminal insert groove 130 is formed in a side surface of the center module 100. A terminal part 230 corresponding to the terminal insert groove 130 of the center module 100 is provided on each of the side modules 200. The terminal insert groove 130 may be formed on one side surface or each of opposite sides surfaces of the center module 100. Of the side modules 200, the side module 200 that is mounted to the left side surface of the center module 100 has the terminal part 230 on a right side surface thereof, and the side module 200 that is mounted to the right side surface of the center module 100 has the terminal part 230 on a left side surface thereof.

Each terminal part 230 has a shape corresponding to the shape of the corresponding terminal insert groove 130 so that the terminal part 230 can be inserted into the terminal insert groove 130. When the terminal part 230 of each side module 200 is inserted into the corresponding terminal insert grooves 130, the side module 200 and the center module 100 are physically coupled to each other and, simultaneously, the side module 200 and the center module 100 are electrically coupled to each other. When the terminal part 230 is removed from the terminal insert groove 130, the side module 200 is physically separated from the center module 100, and the side module 200 and the center module 100 are electrically disconnected from each other.

The center module 100 and the side modules 200 that are coupled to each other are mounted on a mounting support 400. The mounting support 400 is fixed on an upper portion of a center fascia of the vehicle. A receiving groove 410 is formed in an upper surface of the mounting support 400. Since the center module 100 and the side modules 200 are mounted into the receiving groove 410, the center module 100 and the side modules 200 are stably fixed to the mounting support 400 even when the vehicle is stopped or parked.

Alternatively, the center module 100 and the side modules 200 may be installed in the center fascia of the vehicle without requiring the use of the mounting support 400, such that the center display unit 110 and the side display units 210 are oriented toward the occupant of the vehicle.

The cluster of the vehicle in accordance with the embodiment of the present invention further includes a sealing unit 300. The sealing unit 300 is mounted on an outer surface of each terminal part 230 and thus seals a gap between the terminal insert groove 130 and the terminal part 230. The sealing unit 300 is installed between the terminal part 230 and the terminal insert groove 130 so as to prevent dust or the like from entering space between the terminal part 230 and the terminal insert groove 130, absorb vibrations of the vehicle when it is stopped or parked, and prevent the terminal part 230 and the terminal insert groove 130 from being undesirably separated from each other.

The sealing unit 300 includes elastically deformable material. When the terminal part 230 is inserted into the terminal insert groove 130, the sealing unit 300 that is formed of the elastically deformable material can be elastically deformed so that the gap between the terminal part 230 and the terminal insert groove 130 can be sealed. In an embodiment of the present invention, the sealing unit 300 may include material such as rubber or silicon.

Referring to FIG. 3, the center display unit 110 in accordance with an embodiment of the present invention may include a speed indicator 111. The speed indicator 111 is disposed on a central portion of the center display unit 110. The speed indicator 111 indicates the speed of the vehicle. The speed indicator 111 may indicate the speed of the vehicle using digital numbers or an analog-style pointer.

In the embodiment of the present invention, each side display unit 210 may include a warning light indicator 211. The warning light indicators 211 may be indicating lamps for indicating the status of a brake, whether the occupant of the vehicle has worn a seatbelt, whether oil for the vehicle is normal or abnormal, and so forth. In each warning light indicator 211, an icon corresponding to a desired indicating lamp is displayed in such a way that it is turned on.

Referring to FIG. 4, the center display 110 in accordance with an embodiment of the present invention may further include a weather information display 113 and a phone mode display 115. The weather information display 113 and the phone mode display 115 are disposed on respective opposite sides of the speed indicator 111. The weather information display 113 is configured to display the weather outside the vehicle, for example, whether it rains, the amount of rainfall, etc. in the form of digital numbers or icons which are turned on or off. The phone mode display 115 is configured to display connection conditions of the phone. For example, the phone mode display 115 may display the phone connection conditions in such a way that icons indicating phone connection, phone disconnection, etc. are turned on or off.

In the embodiment of the present invention, the side display unit 210 further includes a fuel indicator 213 and a temperature indicator 215. The fuel indicator 213 indicates the amount of fuel of the vehicle in the form of digital numbers or icons which are turned on or off. The fuel indicator 213 may blink to warn the occupant when the amount of fuel of the vehicle is a preset reference value or less.

The temperature indicator 215 is configured to indicate the temperature and humidity in the passenger compartment of the vehicle. The temperature indicator 215 indicates the temperature and humidity of the passenger compartment of the vehicle in the form of digital numbers or icons which are turned on or off. The temperature is indicated as a Celsius temperature or a Fahrenheit temperature Referring to FIG. 5, the center display unit 110 in accordance with an embodiment of the present invention may further include a multimedia information display 117. The multimedia information display 117 provides, to the occupant of the vehicle, information related to a navigation device, information about images and sound of an audio device and an image device, and operating information of the devices.

In an embodiment of the present invention, the side display unit 210 may include an RPM (revolution per minute) indicator 217. The RPM indicator 217 indicates the RPM of the engine of the vehicle. The RPM indicator 217 may indicate the RPM of the engine of the vehicle using digital numbers or an analog-style pointer.

The above-mentioned icons that are displayed on the center display unit 110 and the side display units 210 may have shapes corresponding to those of icons which are used in a corresponding country or region.

In accordance with the present invention, the center module 100 and the side modules 200 may be removably coupled to each other in a simple manner, thus making it possible to provide a cluster that meets the conditions of the vehicle.

Furthermore, in accordance with the present invention, the display styles of the display units 110 and 210 of the center module 100 and the side modules 200 may be easily and selectively changed depending on region, vehicle specifications, and so forth. Hence, the cluster in accordance with the present invention may be suitable for various regions and specifications.

In accordance with the present invention, a center module and a side module may be removably coupled to each other in a simple manner, thus making it possible to provide a cluster that meets conditions of a vehicle.

Furthermore, in accordance with the present invention, display styles of display units of the center module and the side module may be easily and selectively changed depending on regions, specifications of vehicles, and so forth. Hence, the cluster in accordance with the present invention may be suitable for various regions and vehicle specifications.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A cluster for a vehicle comprising
a center module including a center display unit;
a side module mounted to a side surface of the center module and including a side display unit, wherein the side module is removably coupled to the center module;
a terminal insert groove formed in the center module;
a terminal part corresponding to the terminal insert groove and provided on the side module, wherein the terminal part is inserted into the terminal insert groove such that the side module and the center module are coupled to each other; and
a sealing unit mounted on an outer surface of the terminal part and disposed between the terminal insert groove and the terminal part.

2. The cluster of claim 1, wherein the sealing unit includes elastically deformable material.

3. The cluster of claim 1,
wherein the center display unit comprises a speed indicator configured to indicate a speed of the vehicle, and
wherein the side display unit comprises a warning light indicator configured to indicate a status of the vehicle.

4. The cluster of claim 3, wherein the center display unit comprises:
a weather information display configured to display a weather outside the vehicle; and
a phone mode display configured to display a connection status of a phone.

5. The cluster of claim 4, wherein the center display unit further comprises a multimedia information display configured to display a status of a multimedia device installed in the vehicle.

6. The cluster of claim 3, wherein the side display unit comprises:
a fuel indicator configured to indicate an amount of fuel of the vehicle; and
a temperature indicator configured to indicate a temperature in a passenger compartment of the vehicle.

7. The cluster of claim 6, wherein the side display unit further comprises an RPM (revolution per minute) indicator configured to indicate an RPM of an engine of the vehicle.

8. The cluster of claim 3, wherein the center module and the side module are mounted in a receiving groove of a mounting support fixed to a center fascia of the vehicle.

* * * * *